Dec. 19, 1967    R. F. G. COLEY    3,358,379
PROCESS FOR FREEZE-DRYING FROZEN BLOCKS
OF MATERIAL CONTAINING WATER
Filed April 20, 1966
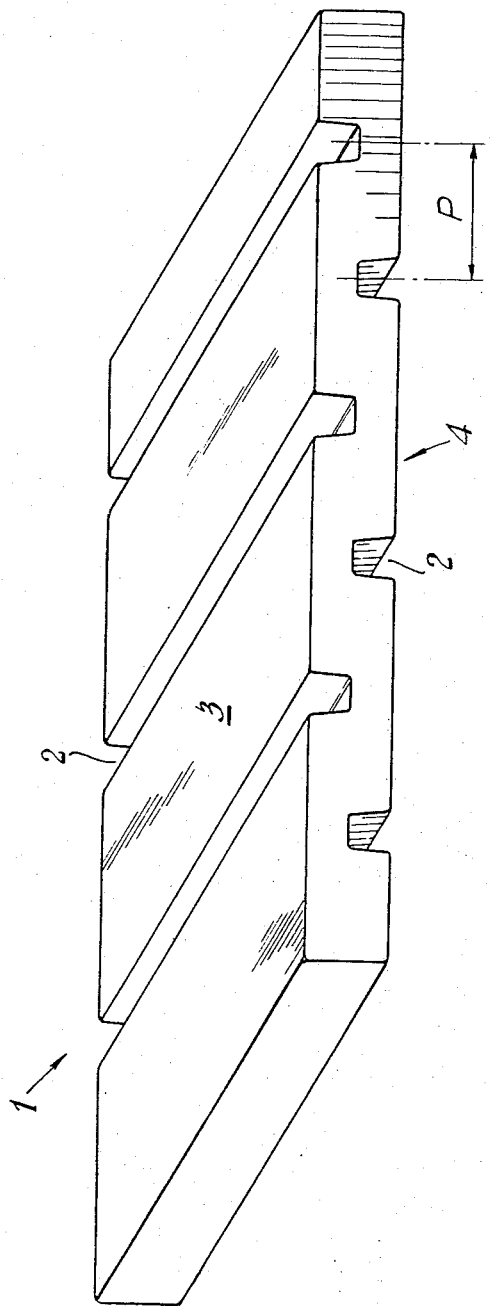

3,358,379
PROCESS FOR FREEZE-DRYING FROZEN BLOCKS OF MATERIAL CONTAINING WATER
Reginald Frederick George Coley, Wiltshire, England, assignor to Vickers Limited, London, England, a British company
Filed Apr. 20, 1966, Ser. No. 543,940
Claims priority, application Great Britain, Apr. 30, 1965, 18,397/65
3 Claims. (Cl. 34—5)

ABSTRACT OF THE DISCLOSURE

Process for freeze-drying materials containing water such as coffee and the like including freezing the material in the form of a thin block having faces provided with grooves facilitating removal of water vapor during freeze drying.

---

This invention relates to the use of frozen blocks of material in freeze-drying processes carried out to drive-off water, present in the blocks as ice, directly from the ice state to the vapour state.

According to one aspect of the present invention there is provided a frozen block of water-containing material for use in a freeze-drying process carried out to drive-off water, present in the block as ice, directly from the ice state to the water vapour state whereby the material is dried, the block having grooves formed therein to assist the flow of water vapour from the block during the freeze-drying process.

According to another aspect of the present invention there is provided a method of freeze-drying water-containing material, the method comprising the steps of freezing the material into a block having grooves formed therein, subjecting the frozen block of material to vacuum, and whilst maintaining the block under vacuum supplying heat to the block to drive-off water, present in the block as ice, directly from the ice state to the water vapour state whereby the material to be dried is dried, the grooves in the block serving to assist the flow of water vapour from the block.

For a better understanding of the invention and to show how the same may be carried into effect reference will now be made, by way of example, to the accompanying drawing in which the single figure is a perspective view of a frozen block of water-containing material.

The block 1 shown in the figure is a frozen block of coffee. The block 1 is generally rectangular and is thin compared with its length and width. For example, the block 1 may be 7" long, 4" wide and ⅝" thick. Parallel grooves 2 running across the full width of the block 1 are formed in the two largest surfaces of the block 3, 4, the grooves 2 being equally spaced apart along the block 1 with successive grooves on alternate sides of the block 1.

In a block having the dimensions mentioned above, the grooves on each surface are pitched 2" apart, this being the dimension designated P in the figure. The depth of each groove 2 is half the thickness of the block, i.e. in the example just mentioned the grooves are 5/16" deep, and the sides of each groove 2 taper inwardly towards the base of the groove. This tapering facilitates removal of the block 1 from the mould in which it is produced. At its widest part the width of each groove 2 is the same as the depth theerof, i.e. each groove 2 is 5/16" wide at its widest part in the example mentioned above.

The frozen block of coffee just described is for use in a freeze-drying process carried out to drive-off water, present in the block as ice, directly from the ice state to the water vapour state, thereby drying the coffee. In order to effect such drying, coffee poured into moulds is frozen to produce blocks of frozen coffee such as the block 1 just described in detail. The frozen blocks 1 are inserted in a vacuum-tight chamber, the blocks 1 being laid flat on trays that are placed in the chamber, the chamber door is closed, and the chamber is evacuated to a very low pressure (e.g. 0.15 mm. Hg absolute). Alternatively the blocks 1 may be hung in the chamber. This low pressure is maintained and heat is supplied to the blocks 1 to cause sublimation to take place. The coffee present in the blocks 1 is thus dried. During drying the presence of the grooves 2 in the blocks 1 assists the flow of water vapour from the blocks 1, the grooves 2 in the under surfaces of each block 2 (in the case where the blocks are laid flat on trays) providing vapour release paths for the bottom of the block. It will be noted that the provision of the grooves 2 increases the surface area of the block 1 for any given set of overall dimensions of the block.

It will be appreciated that liquids other than coffee can be frozen into blocks, such as that described in detail, to be freeze-dried. Examples are tea, citrus juices and egg.

It is to be understood that the particular size and shape of frozen block 1 that has been described, and the particular shape and configuration of the grooves 2 formed therein, is an example only and that blocks 1 of different sizes, and of shapes other than rectangular, and having grooves 2 of various shapes and configurations formed therein, can be prepared for use in a freeze-drying process such as that briefly described above.

I claim:

1. In a process for freeze-drying materials containing water in which the watery material to be dried is frozen into a block and thereafter subjected to freeze-drying under vacuum conditions whilst supplying heat to the block to drive off the water present therein as ice directly from the ice state to the water vapor state, wherein the improvement comprises freezing the water-containing material to be subjected to freeze-drying in a mold shaped to provide a frozen relatively thin block compared to its width and length having opposite faces defining spaced relatively deep grooves, whereby the removal of the water vapor from the block during the freeze-drying and heating steps of the process is facilitated by the presence of said grooves which serves to facilitate the escape of water vapor from the block.

2. The process as claimed in claim 1, wherein the water-containing material prior to freezing is a fluid and wherein said grooves in one face of the block alternate with grooves in the opposite face of the block and extend from edge to edge of the block.

3. The process as claimed in claim 1, wherein the grooves have a width and depth approximating one-half the thickness of the block and extend from edge to edge thereof.

References Cited

UNITED STATES PATENTS

| | | | |
|---|---|---|---|
| 2,652,766 | 9/1953 | Cralle | 34—5 |
| 3,118,742 | 1/1964 | Dalgleish | 34—5 |
| 3,169,070 | 2/1965 | Mehrlich | 34—5 |
| 3,233,562 | 2/1966 | Nakamura | 62—66 |
| 3,262,212 | 7/1966 | De Buhr | 34—5 |

WILLIAM J. WYE, *Primary Examiner.*